United States Patent

[11] 3,549,114

| [72] | Inventor | Rolf Juerg Eiermann<br>Thalwil, Switzerland |
| --- | --- | --- |
| [21] | Appl. No. | 738,341 |
| [22] | Filed | June 19, 1968 |
| [45] | Patented | Dec. 22, 1970 |
| [73] | Assignee | Aluphon A G,<br>Zug, Switzerland |
| [32] | Priority | June 19, 1967 |
| [33] | | Switzerland |
| [31] | | No. 8678/67 |

[54] SUSPENSION MEANS FOR FALSE CEILINGS
4 Claims, 3 Drawing Figs.

[52] U.S. Cl. .................................................. 248/340,
24/73; 52/484
[51] Int. Cl. ................................................... E04b 5/52
[50] Field of Search ............................................. 248/214,
215, 301, 304, 305, 340, 339; 287/189.35;
24/73.14, 73.12, 84B, 237, 129B, 257, 259PNC,
259RC; 52/484

[56] References Cited
UNITED STATES PATENTS

| 1,025,964 | 5/1912 | Costuma ...................... | 24/73UX |
| 2,662,745 | 12/1953 | Jorn et al. ..................... | 24/84X |
| 3,085,666 | 4/1963 | Lydard ......................... | 287/189.35X |

*Primary Examiner*—Roy D. Frazier
*Assistant Examiner*—J. Franklin Foss
*Attorney*—Beveridge & DeGrandi ABSTRACT: A suspension means for false ceilings composed of panels is adapted to have its lower end engaged in recesses provided in upwardly directed flanges which are formed at the edges of the ceiling panels. The suspension means has the said lower end equipped with two differently shaped tongues, one tongue being formed into a supporting hook to be engaged in a recess of the edge flanges while the other tongue is adapted to form a safety catch which extends across the supporting hook to lie applied against the upper edge of one of the edge flanges.

PATENTED DEC 22 1970   3,549,114

INVENTOR:
ROLF JÜRG EIERMANN
by
Browne, Schuyler & Beveridge
A. Horneffer

SUSPENSION MEANS FOR FALSE CEILINGS

This invention relates to suspension means for suspending to a supporting device false ceilings which are composed of panels or like members.

Suspension means for false ceilings have already been suggested. One type of prior art suspension means is made from wire or sheet metal and has one end bent in such a way as to permit its being hung from a supporting device, usually a latticework of pipes. To this end, said one end of the suspension means is arcuate. The other part of the suspension means comprises two limbs or tongues with corrugated free ends. At the suspension of the ceiling panels the edge flanges of two adjoining panels are pushed from below between the two tongues of the suspension means which has been hung from the supporting device, so that the corrugation crests snap into recesses provided in the edge flanges of the panels. The tongues of these suspension means thus are resilient elements which are urged into the recesses under a given force and against the weight of the panels supported by the tongues. The ceiling panels are readily dismounted in that a sheet metal member or spatula is introduced into the joint between two panels spreading the suspension means against the spring force of the tongues so that the panels can be removed.

A false ceiling suspended with the aid of these suspension means is thus readily mounted and dismounted. It is imperative, however, that the spring force of the tongues is sufficient. It should be observed that it is not possible to increase the spring force beyond certain limits, since the tongues must be of a definite length, and the rigidity of the tongues is thus restricted already by their shape. In addition, the suspension means cannot be made from optionally thick wire or sheet metal for economical reasons.

The present invention overcomes the drawbacks outlined in the foregoing. This suspension means is thus characterized by the fact that it is provided at the end engaging the edge flanges of the ceiling panels with two differently shaped tongues, one of which is in the form of a supporting hook to be engaged in a recess of a panel edge flange, while the other is adapted to form a safety catch which extends across the supporting hook to lie applied against the upper edge of one of the panel edge flanges.

An embodiment, chosen by way of example, of the invention will be described in detail in the following specification with reference to the accompanying drawing in which.

Figure 1:
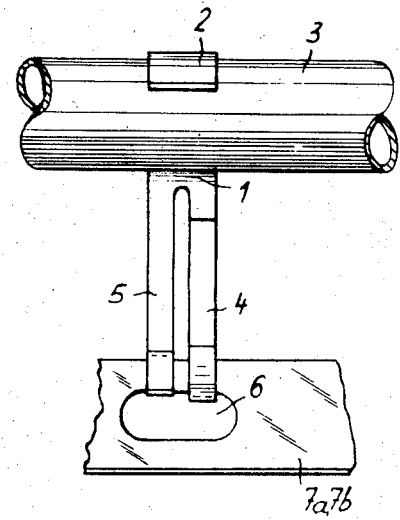
FIG. 1 is a side elevation of the suspension means.
Figure 2:
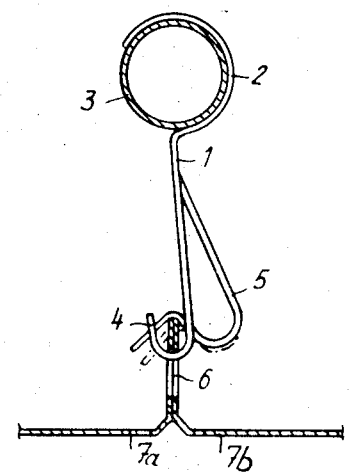
FIG. 2 is a front view thereof.

The suspension means 1 is normally made from sheet steel or steel wire. The end 2 of the suspension means 1 is arcuate to permit its being hung from the supporting pipe 3. At the opposite end the suspension means 1 is divided to form two tongues, the tongue 4 constituting the supporting hook and the tongue 5 constituting the safety catch. The tongue 4 therefore has a hook-shaped end for engagement in one of the recesses in the edge flanges of the ceiling panels 7a and 7b.

The tongue or safety catch 5 does not extend so far downward as does the tongue 4. First, the tongue 5 extends slightly in a rearward direction, then it makes a sharp bend and finally passes above the supporting hook. The portion extending above said hook is adapted to lie applied against the upper edge of one of the edge flanges.

In the preferred embodiment illustrated the portion of the tongue or safety catch 5 extending across the supporting hook is bent into the shape of an inverted V. The apex of the inverted V is preferably situated directly above the bottom of the supporting hook. The edge flanges will engage said apices of the suspension means in the mounted position of the ceiling panels.

At the mounting, the suspension means 1 are first hung from the supporting pipe 3. The tongues or safety catches 5 are then urged in an upward direction by the edge flanges of the ceiling panels 7a and 7b until the supporting hooks 4 can engage and snap into the recesses 6.

Figure 3:
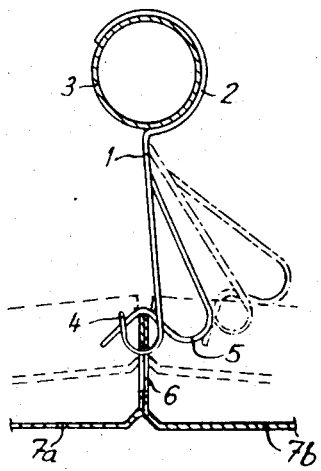
FIG. 3 is a front view of said suspension means at the dismounting of the ceiling panels.

For the dismounting of the panels, illustrated in FIG. 3, it suffices to urge the panels upwardly at the suspension points. By reason of the configuration of the tongues or safety catches 5 the suspension means 1 are swung aside and the supporting hooks 4 leave the recesses 6. The panels can now be lowered and removed.

The design of the two tongues of the suspension means as a supporting hook and a safety catch, respectively, provides an extremely reliable suspension means which nevertheless allows an easy mounting and dismounting of false ceilings without the use of tools. Also in open premises where false ceilings are mounted with the aid of the improved suspension means there is no risk that the ceiling panels will fall down under the action of wind bursts or heavy temperature variations.

I claim:

1. Suspension means for suspending to a supporting device false ceilings composed of panels or like members, the suspension means being adapted for connection at one end with the supporting device and for engagement at the other end in recesses provided in upwardly directed flanges at the edges of the ceiling panels, characterized by the fact that the suspension means is provided at the end engaging the edge flanges of the ceiling panels with two differently shaped tongues, one of which is in the form of a supporting hook to be engaged in a recess of a panel edge flange, while the other tongue constituting a safety catch is bent into the shape of an inverted V the apex thereof being suitably situated directly above the bottom of the supporting hook to lie against the upper edge of one of the panel edge flanges.

2. Suspension means according to claim 1 in combination with a ceiling panel which has a recessed upwardly directed flange, with the supporting hook passing through said recess and the safety catch contacting the upper edge of the flange.

3. Suspension means for suspending to a supporting device false ceilings composed of panels or like members, the suspension means being adapted for connection at one end with the supporting device and for engagement at the other end in recesses provided in upwardly directed flanges at the edges of the ceiling panels, characterized by the fact that the suspension means is provided at the end engaging the edge flanges of the ceiling panels with two differently shaped tongues, one of which is in the form of a supporting hook to be engaged in a recess of a panel edge flange, while the other tongue is adapted to form a safety catch which extends above the supporting hook to lie applied against the upper edge of one of the panel edge flanges, said safety catch being movable upwardly to permit placement of a recess in a panel edge flange over said supporting hook, said safety catch having an outer end portion inclined downwardly and extending laterally beyond the supporting hook; whereby upward movement of a ceiling panel edge flange against said outer end portion will deflect the safety catch upwardly and guide a recess in the ceiling panel edge flange toward the supporting hook.

4. Suspension means according to claim 3 in combination with a ceiling panel which has a recessed upwardly directed flange, with the supporting hook passing through said recess and the safety catch contacting the upper edge of the flange.